United States Patent [19]

Kappler et al.

[11] 4,050,239
[45] Sept. 27, 1977

[54] THERMODYNAMIC PRIME MOVER WITH HEAT EXCHANGER

[75] Inventors: Guenter Kappler, Munich; Adolf Fehler, Pfaffing, both of Germany

[73] Assignees: Motoren- und Turbinen-Union Munchen GmbH; M.A.N. Maybach Mercedes-Benz, both of Munich, Germany

[21] Appl. No.: 611,410

[22] Filed: Sept. 8, 1975

[30] Foreign Application Priority Data

Sept. 11, 1974 Germany .............................. 2443363

[51] Int. Cl.² ............................ F02C 7/10; F02C 7/12
[52] U.S. Cl. ................................ 60/39.51 R; 60/39.65; 60/39.66
[58] Field of Search ............ 60/39.51 R, 39.65, 39.66, 60/39.23, 39.29

[56] References Cited

U.S. PATENT DOCUMENTS

| 2,622,395 | 12/1952 | Bowden | 60/39.51 R |
|---|---|---|---|
| 2,782,596 | 2/1957 | Lindhagen et al. | 60/39.65 |
| 3,705,492 | 12/1972 | Vickers | 60/39.51 R |
| 3,717,994 | 2/1973 | Templin | 60/39.51 R |
| 3,742,702 | 7/1973 | Quinn | 60/39.51 R |
| 3,826,077 | 7/1974 | Quigg et al. | 60/39.51 R |
| 3,826,078 | 7/1974 | Quigg | 60/39.65 |
| 3,899,876 | 8/1975 | Williamson | 60/39.65 |
| 3,899,882 | 8/1975 | Parker | 60/39.65 |

FOREIGN PATENT DOCUMENTS 836,135  6/1960  United Kingdom ................ 60/39.51

Primary Examiner—Carlton R. Croyle
Assistant Examiner—L. J. Casaregola
Attorney, Agent, or Firm—W. G. Fasse; W. W. Roberts

[57] ABSTRACT

The useful life of a gas turbine combustion chamber and especially its flame pipe is increased by an improved cooling arrangement which branches off a small proportion of the air from the compressor upstream of the combustion chamber. The branched off air is directed into the combustion chamber and onto the flame pipe so that it flows in a cooling manner around at least the front end of the flame pipe without initially substantially participating in the combustion.

8 Claims, 3 Drawing Figures

THERMODYNAMIC PRIME MOVER WITH HEAT EXCHANGER

BACKGROUND OF THE INVENTION

The present invention relates to a thermodynamic prime mover with a heat exchanger. More particularly, the invention relates to a gas turbine with a heat exchanger, which turbine is especially suitable for motor vehicles.

Prior art gas turbines comprise heat exchangers for supplying a portion of the heat contained in the exhaust gas, to the relatively cold compressed air in order to save fuel. It is this preheating of the compressed combustion air which makes possible an economical operation of a gas turbine, especially one that is employed as the prime mover in a motor vehicle.

However, the temperature of the air entering the combustion chamber of such gas turbines using heat exchange means in rather high, for example in the range from 700° C and even higher. Where no heat exchange means are used in gas turbines the temperature of the air entering the combustion chamber is customarily in the range of 200° C to 400° C. It has been found that the preheated air, that is air having a temperature of 700° C or more, does not have a sufficient cooling ability to adequately cool the flame pipe, which is conventionally made of sheet metal. As a result, the useful life of the flame pipe becomes rather short in gas turbines using heat exchange means whereby an economical operation again becomes questionable.

Attempts have been made heretofore to solve the above problem by providing complicated cooling slot configurations for the flame pipe. However, tests have shown that a satisfactory improvement in the cooling efficiency cannot be attained by means of such cooling slot configurations.

OBJECTS OF THE INVENTION

In view of the foregoing, it is the aim of the invention to achieve the following objects, singly or in combination:

to provide an efficient cooling of the flame pipe of a heat exchanger gas turbine whereby the disadvantages of the prior art are to be avoided, more specifically, to avoid a costly flame pipe construction while simultaneously assuring that the flame pipe will be able to withstand high temperature loads even during continuous operation;

to provide cooling means for the flame pipe which cool the latter externally as would normally be possible where the turbine does not use a heat exchanger;

to use a proportion of the compressed air for the cooling of the flame pipe while avoiding the loss of that proportion of compressed air for its main purpose, namely the sustaining of the combustion;

to guide a proportion of the compressed air as close as possible to and around at least the upstream end of the flame pipe, and to guide a proportion of the compressed air close to and around the flame pipe substantially along its entire length.

SUMMARY OF THE INVENTION

The above objects have been achieved in a gas turbine with a heat exchanger, a flame pipe in a combustion chamber and a compressor by branching off a small proportion, for example 3 to 10%, of the compressed combustion air, upstream of the heat exchanger by means of a separate or second conduit which directs the branched-off air directly into the combustion chamber and onto the flame pipe so that the branched-off air flows in a cooling manner at least over and around the upstream end of the flame pipe without substantially participating in the combustion at this point.

The foregoing teaching makes it now possible to cool the flame pipe externally or from the outside substantially as efficiently as is possible in a turbine without heat exchanger. In addition, there is the advantage that the branched-off compressed air is not lost because, although this air does not participate in the combustion at the point of cooling, it is used for the combustion in the turbine by re-entering this air into the hot gas stream upstream of the turbine inlet port means.

BRIEF FIGURE DESCRIPTION

In order that invention may be clearly understood, it will now be described, by way of example, with reference to the accompanying drawings, wherein.

Figure 1:
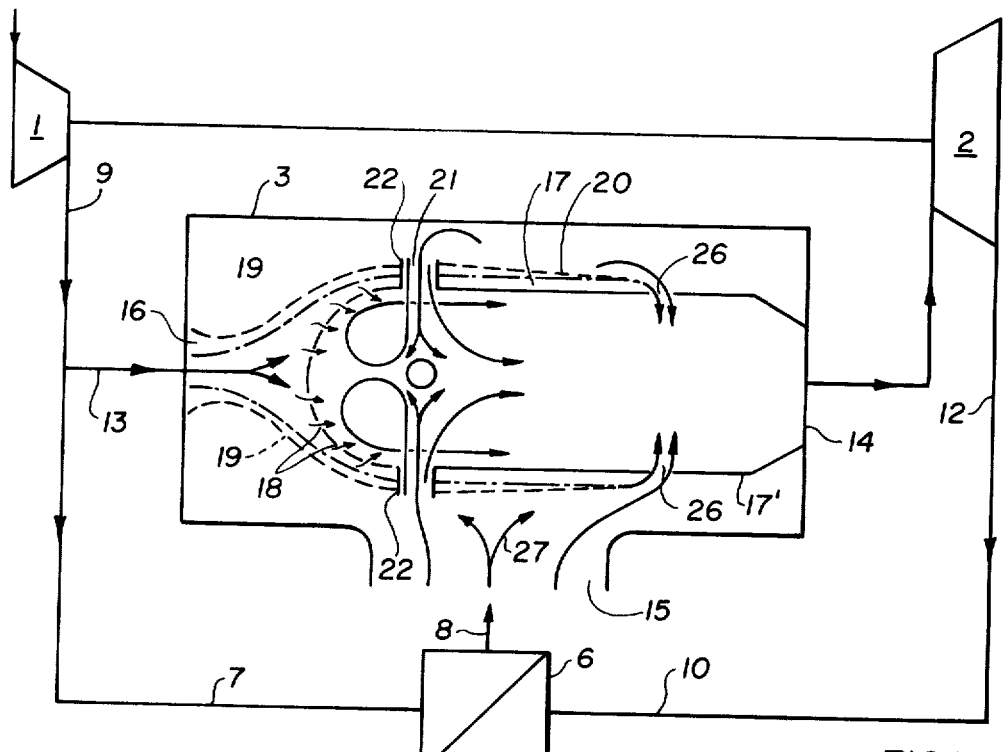
FIG. 1 illustrates schematically a gas turbine prime mover with a heat exchanger and with cooling of the flame pipe by means of blowing cool compressor air onto the upstream end of the flame pipe.

DETAILED DESCRIPTION OF PREFERRED EXAMPLE EMBODIMENTS:

FIG. 1 illustrates schematically a prime mover according to the invention including a compressor 1, a turbine 2, a combustion chamber 3, and heat exchanger means 6. First conduit means 7 connect the compressor outlet port 9 with the inlet of the heat exchanger 6. The first conduit means also include a connection 8 operatively arranged between the heat exchanger 6 and an air inlet port 15 of the combustion chamber 3. The combustion chamber exit 14 is connected to the turbine 2 in a conventional manner. Similarly, the compressor 1 is also connected conventionally to the turbine 2. Further, the turbine exhaust 12 is connected by conventional means 10 to the heat exchanger 6 which has an exhaust port 11.

According to the invention there are provided second conduit means 13 branching off from the first conduit member 7 upstream of the heat exchanger 6. The second conduit means 13 connect the outlet port 9 of the compressor 1 directly to the combustion chamber 3 at a fresh air inlet port 16 located so that fresh air from the first or fresh air conduit 7 is directed onto the upstream end of the flame pipe 17 located coaxially in the combustion chamber 3. The quantity of not yet preheated fresh air directed onto the upstream end of the flame pipe 17 amounts to about 3 to 10% of the entire quantity of air supplied by the compressor 1. It has been found that this relatively small quantity of fresh, not yet preheated air efficiently cools the flame pipe to prolong the useful life of the latter.

Figure 2:
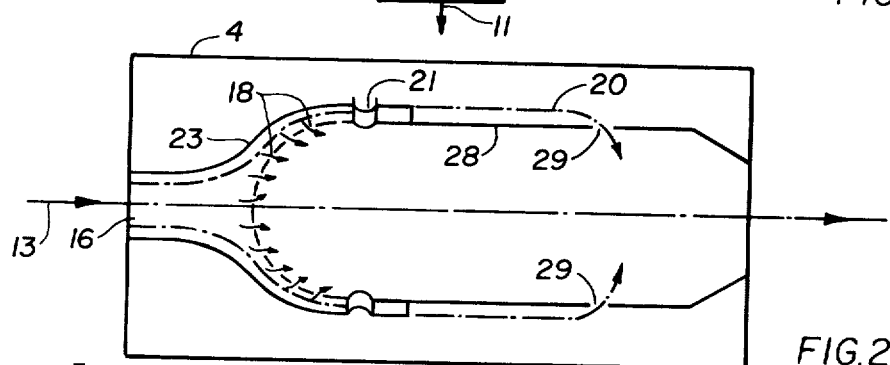
FIG. 2 illustrates another embodiment wherein the cooling air is guided about and into contact with the upstream end of the flame pipe.

According to the invention, a plurality of apertures 18 are provided in the flame pipe 17 at the upstream end thereof where the branched-off fresh cooling air hits the flame pipe 17. Thus, a small proportion of the branched-off not yet preheated fresh air may enter into a border zone of the combustion chamber 3, whereas most of the branched-off fresh, not yet preheated air flows along the outer surface of the flame pipe 17 to intensively cool the flame pipe. The dashed line 19 indicates the outer envelope of the cooling air flow 20 which itself is shown by the dash-dotted line. This envelope 20 of cooling air 19 extends all around the flame pipe 17 almost to its downstream end 17' where holes 26 permit the entry of the cooling air into the flame pipe 17. This flow is assured because the inlet ports 21 near the upstream end of the flame pipe 17 are provided with pipe extensions 22 which admit the secondary air 27 from the heat exchanger 6 into the flame pipe 17. A portion of the branched-off air will also enter through the pipe extensions 22 but due to the radially directed pipe extensions 22 most of this branched-off air will flow along the outer surface of the flame pipe 17 to cool it effectively. Thus it will be appreciated that there is substantially no loss of the branched-off air since this air is returned into the hot gas stream prior to entry into the turbine 2. FIG. 2 illustrates a further embodiment of the invention wherein the flame pipe 28 in the combustion chamber 4 is provided with guide means 23 for the branched-off cooling air coming from the second conduit means 13 into the inlet port 16 of the combustion chamber 4. The guide means 23 are formed as a sheet metal casing in the shape of a bonnet which extends from the inlet port 16 to surround the upstream end of the flame pipe 28. The downstream end of the guide means 23 is open to permit the flow of the cooling air 20 as shown by the dash-dotted line in FIG. 2. However, some of the branched-off cooling air also enters into the flame pipe 28 through openings 18 in the upstream end of the flame pipe 28. These openings 18 extend substantially radially inwardly. A further small proportion of cooling air also enters the flame pipe 28 through the port holes 21 but most of the cooling air will flow along the outer surface of the flame pipe 28 and enter it through apertures 29 as shown, where it is combined with the secondary air from the heat exchanger and mixed with the hot combustion gas. The guide bonnet 23 has the advantage that the cooling air must flow in close contact with the surface of the flame pipe 28. In addition, it facilitates the cooling of the inner and outer surface of the flame pipe 28 whereby an efficient cooling is made possible with even less branched-off air whereby the efficiency of the heat exchanger 6 is improved.

Incidentally, the guide bonnet 23 for the cooling air is spaced from the outer surface of the upstream end of the flame pipe 28 just sufficiently to provide a flow passage for the cooling air. The guide bonnet 23 extends to a point just downstream of the inlet ports 21 for the combustion air and the ends of the bonnet 23 are open to permit the flow 20 of cooling air as shown in FIG. 2. The upstream end of the flame pipe 28 is also provided with small apertures 18 for the cooling air to improve the cooling effect.

Figure 3:
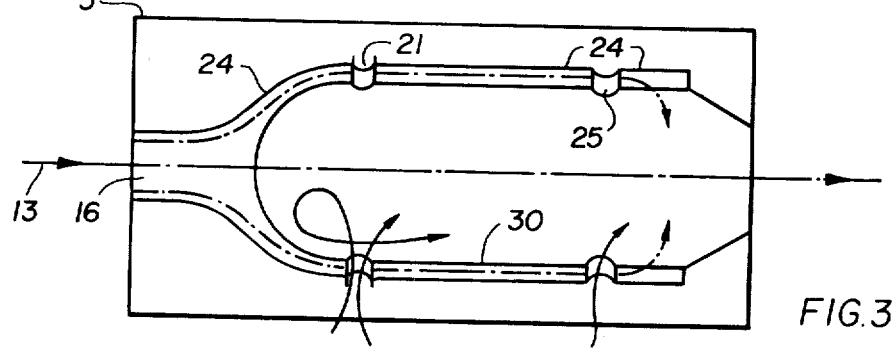
FIG. 3 shows a further embodiment wherein cooling air guide means extend substantially along the entire length of the flame pipe.

FIG. 3 illustrates a further embodiment of the invention in which a sheet metal housing 24 envelopes the flame pipe 30 in the combustion chamber 5 substantially along the entire length of the flame pipe 30. The upstream end of the housing 24 has substantially the same shape as the bonnet 23, however, the housing 24 extends almost to the exit end of the flame pipe 30. In addition, the housing 24 is closed at its downstream end. Radially extending bores 25 substantially adjacent to the downstream end of the flame pipe 30, interconnect the space between the guide housing 24 and the inside of the flame pipe 30 whereby substantially all of the branched-off cooling air is introduced into the mixing chamber of the flame pipe 30.

The embodiment of FIG. 3 has the advantage that even the downstream portions of the flame pipe 30 are cooled more intensively than in the other embodiments. This feature is especially important because these downstream portions are heated to a high degree particularly at full power output of the prime mover. Thus, the intensive cooling accomplished according to the invention presents damage to the downstream end of the flame pipe even where a continuous operation is involved.

Although the invention has been described with reference to specific example embodiments, it is to be understood, that it is intended to cover all modifications and equivalents within the scope of the appended claims.

What is claimed is:

1. A thermodynamic prime mover comprising a combustion chamber having cooling air inlet means and combustion air inlet means, an air compressor, and a heat exchanger, as well as a turbine, first conduit means operatively interconnecting said air compressor and said heat exchanger as well as said combustion chamber and said turbine, second conduit means branching off from said first conduit means upstream of said heat exchanger, a flame pipe located in said combustion chamber and having an upstream end facing said cooling air inlet means of said combustion chamber and a downstream end operatively connected to said turbine, said second conduit means being operatively connected to said cooling air inlet means of said combustion chamber, said second conduit means being dimensioned for directing about 3 to 10% of cool compressed air from said compressor toward and around at least the upstream end of said flame pipe whereby said 3 to 10% of compressed cool air forms a cooling jacket at least around the upstream end of said flame pipe without initially substantially participating in the combustion; said flame pipe further comprising substantially radially extending pipe sections adjacent the upstream end thereof and arranged for cooperation with said combustion air inlet means to receive preheated combustion air from said heat exchanger whereby the preheated combustion air enters the flame pipe through said pipe sections and thus through said cooling jacket, said pipe sections substantially separating said cool air of the cooling jacket from the preheated combustion air as the latter enters into said flame pipe.

2. The apparatus according to claim 1, further comprising apertures in the upstream end of said flame pipe, said apertures substantially facing said cooling air inlet means of said combustion chamber whereby a fraction of said cooling air serves for cooling said upstream end of the flame pipe and also participates in the combustion which is mainly supported by said preheated combustion air.

3. The apparatus according to claim 1, further comprising a sheet metal casing inside said combustion chamber, said sheet metal casing also having an upstream end and a downstream end, said sheet metal casing being shaped to surround the upstream end of the flame pipe to leave a space between said casing and said flame pipe, and means connecting said upstream end of said sheet metal casing to said cooling air inlet means and thus to said second conduit means in such a manner that said branched-off, compressed, cool air flows substantially through said space between said flame pipe and said sheet metal casing, said apparatus further comprising apertures in the upstream end of said flame pipe, said apertures being surrounded by said sheet metal casing and facing substantially said cooling air inlet means.

4. The apparatus according to claim 1, further comprising a sheet metal housing inside said combustion chamber and shaped to surround the flame pipe substantially along its entire length to leave a space between said sheet metal housing and said flame pipe, means connecting said sheet metal housing to said cooling air inlet means in such a manner that said branched-off, compressed, cool air flows through said space from said upstream end of said flame pipe to said downstream end of said flame pipe and port means in the flame pipe connecting the downstream end of said flame pipe with said space between said sheet metal housing and said flame pipe.

5. The apparatus according to claim 4, wherein said port means in said flame pipe extend radially into the downstream end of said flame pipe from the space between said sheet metal housing and said flame pipe.

6. The apparatus according to claim 4, wherein said sheet metal housing has a closed downstream end downstream of said port means.

7. In a gas turbine apparatus having a compressor, a combustion chamber having a flame pipe, at least one turbine, and a heat exchanger connected to preheat a first portion of the output air of the compressor with heat from the exhaust gas of the turbine, means to supply the preheated air portion to the combustion chamber, and further means supplying a second portion of the compressor air output to the upstream end of the flame pipe without preheating, wherein the combustion chamber comprises a housing, said flame pipe being positioned in said housing which has preheated air inlet means connected to said heat exchanger and communicating with the space inside the flame pipe, the improvement comprising a cool air inlet means in said housing communicating with said compressor through said further supplying means, a cool air guide bonnet operatively connected to said combustion chamber housing at said cool air inlet means and extending within said combustion chamber housing to at least partially envelope said flame pipe, said cool air guide bonnet being radially spaced from said flame pipe, said further supplying means for said second portion of the compressor air output comprising means for supplying from 3 to 10% of the cool air output of said compressor to said combustion chamber by way of said cool air inlet and into said cool air guide bonnet; a plurality of pipe sections extending radially from said flame pipe for directing preheated air from said preheated air supply means through said air guide bonnet to said flame pipe, thereby avoiding mixing of the cooling air and the preheated combustion air, and port means in said flame pipe for supplying said cool air from said compressor output into said flame pipe after at least part of the cool air has passed along the outside wall of said flame pipe to form a cooling jacket around the flame pipe.

8. The gas turbine apparatus according to claim 7, further comprising a plurality of cooling air ports in the upstream end of said flame pipe, whereby part of said cooling air enters said flame pipe by way of said cooling air ports.

* * * * *